July 13, 1954  W. G. HAGENS  2,683,327
POISON DUSTING MACHINE

Filed May 26, 1952  2 Sheets-Sheet 1

INVENTOR
Walter C. Hagens

BY

ATTORNEY

July 13, 1954    W. G. HAGENS    2,683,327
POISON DUSTING MACHINE
Filed May 26, 1952    2 Sheets-Sheet 2
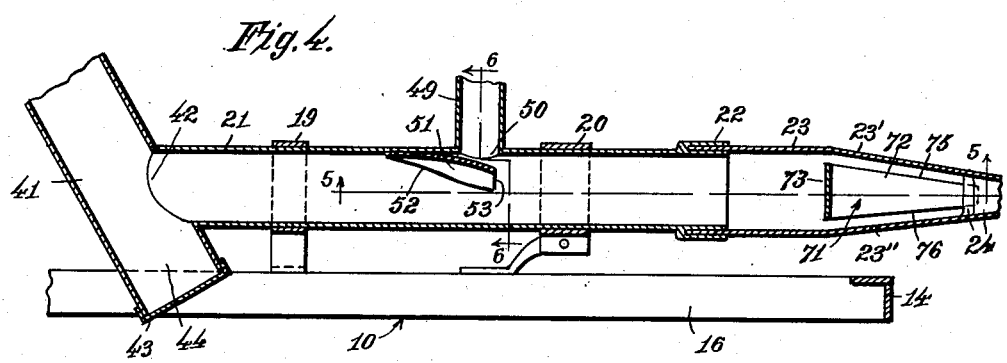
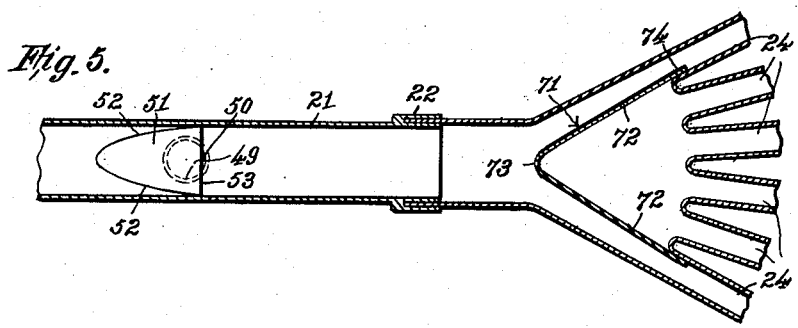
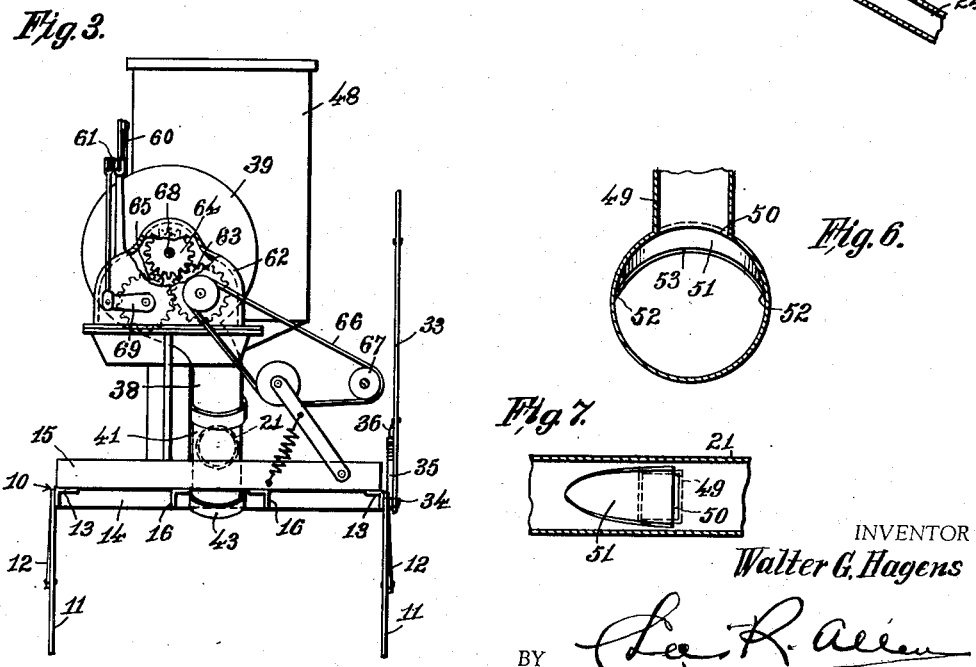
INVENTOR
Walter G. Hagens
BY
ATTORNEY Patented July 13, 1954

2,683,327

UNITED STATES PATENT OFFICE 2,683,327

POISON DUSTING MACHINE

Walter G. Hagens, Yoakum, Tex.

Application May 26, 1952, Serial No. 290,023

4 Claims. (Cl. 43—148)

The present invention relates to a dusting machine for applying a plant treating dust, such as an insecticide or bactericide, to growing field crops; and this application is a continuation-in-part of my pending application for patent, Serial No. 995, filed January 7, 1948, now abandoned.

Machines of the type under consideration consist generally of a substantially horizontal blower pipe, means for supplying air under pressure through said pipe, a discharge nozzle or nozzles in communication with the discharge end of said pipe, and means for continuously supplying a plant treating powder to the blower pipe at a station between the pressure supplying means and said discharge end. Plant dusting materials used in such machines are usually in the form of an impalpable powder which tends to adhere to and agglomerate upon the walls of the blower pipe, thereby gradually decreasing the efficiency of the device.

The object of the present invention is to provide a dusting machine of such construction as to substantially prevent the accumulation of the dusting powder within the passageways of the device.

A further object of the invention is to provide a unitary dusting machine of the type mentioned which may be readily attached to, and supported upon, a tractor or the like, and which will derive its operative power from said tractor.

A further object of the invention is to provide a dusting machine having a plurality of spaced discharge nozzles, and means for effectively distributing the dust laden air in even quantities to the several nozzles.

A further and particular object of the invention is to provide means whereby a uniform, non-pulsating and non-whirling current of air is forced through the blower pipe.

A further object of the invention is to provide novel means for uniformly supplying the powder to the stream of air passing through the blower pipe, throughout substantially the full width thereof.

The device embodying the invention consists generally in a supporting frame, a longitudinally disposed blower pipe fixed to said frame and terminating in a discharge nozzle or nozzles, a rotary blower for supplying a continuous current of air through said blower pipe, a hopper constituting a container for the dusting material and communicating with the blower pipe, an agitator for insuring a constant feed of material from the hopper to said blower pipe, and means for uniformly distributing the powder to the current of air passing through the blower pipe; the whole constituting a unitary structure adapted to be detachably secured to the end of a tractor or the like to project beyond said end and in spaced position above the ground. Means are also provided whereby the rotary blower and the agitator are driven from a single power take-off from the tractor.

The invention further consists in a novel connection between the exhaust duct from the rotary blower and the blower pipe whereby the pulsating discharge from the blower is cushioned and transformed into a constant non-pulsating current through the blower pipe.

The invention further consists in a novel distributor plate supported beneath the discharge end of the powder feed pipe, to uniformly separate and distribute the powder into the current of air as it passes through the blower pipe.

The invention further consists in various details of construction and arrangement of parts, as will be fully described hereinafter and particularly pointed out in the claims.

The invention will be more readily understood by reference to the accompanying drawings forming a part of this specification and in which, Fig. 1 is a side elevation of a dusting machine embodying the invention;

Fig. 3 is an end elevation of the device;

Fig. 4 is a detail longitudinal vertical section taken through the blower pipe, on substantially the line 4—4 of Fig. 2 and illustrated upon an enlarged scale;

Fig. 5 is a horizontal section of the same on the line 5—5 of Fig. 4, and looking upwardly in the direction indicated by the arrows;

Fig. 6 is a transverse section on the line 6—6 of Fig. 4, on a much enlarged scale; and Fig. 7 is a detail view illustrating a modification of the powder supplying duct.

Figure 1:
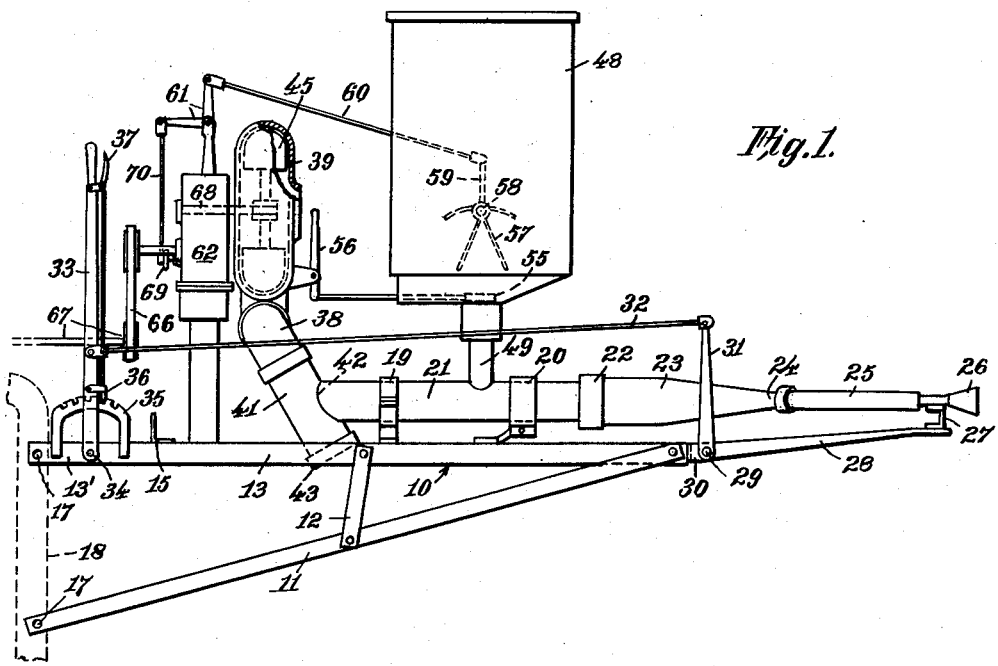
Figure 2:
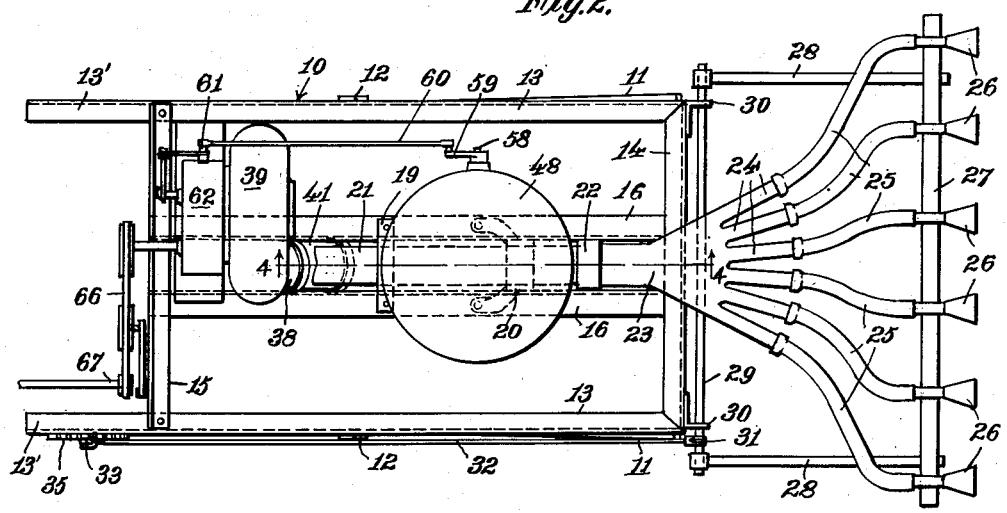
Fig. 2 is a plan view thereof.

Referring to the drawings, the supporting frame comprises a horizontal platform 10, and a pair of downwardly and angularly extending brace bars 11, rigidly connected to the platform 10 by substantially vertical bars 12. The platform 10 consists of a pair of longitudinal side bars 13, a transverse outer end bar 14, a transverse bar 15, spaced inwardly from the inner ends of the side bars, and intermediate longitudinal bars 16 extending between the bars 14 and 15. The projecting ends 13' of the side bars 13, and the adjacent ends of the bars 11 are provided with bolt holes 17 to facilitate attaching the device to a tractor frame 18 indicated in dotted lines in Fig. 1. By this arrangement the entire dusting machine is attachable to and detachable from a truck as a unit; and when in position upon the truck it is supported entirely thereby, and out of contact with the ground.

Supported on the bars 16 by clamp brackets 19 and 20 is a longitudinally disposed horizontal blower pipe 21, one end of which is provided with a socketed collar 22 into which is fitted one end of a distributor head 23 having a plurality of radially extending tubular nipples 24 to which are attached flexible tubes 25 extending to distributing nozzles 26. The nozzles 26 are fixed to a transverse bar 27 carried at the outer ends of a pair of arms 28, the inner ends of which are affixed to a shaft 29 mounted in brackets 30 fixed to the platform 10. Fixed to the shaft 29 is a lever 31 to the upper end of which is connected an elongated link 32 which is connected to a lever 33 pivotally mounted as at 34 upon the platform 10. An arcuate latch bar 35 is fixed in operative relation to the lever 33 for cooperation with a latch 36 on the lever 33 actuated by the usual grip 37. It is obvious that by means of the lever 33, the bar 27 and the nozzles 26 thereon may be raised or lowered as desired, according to the height of the plants being treated.

The opposite end of the blower pipe 21 from the distributor head 23 is connected to the exhaust duct 38 of a rotary blower 39, by an angularly disposed tubular head 41 which is preferably somewhat greater in diameter than that of the blower pipe 21. See Fig. 4. The lower end of the head 41 extends beyond the port 42 between the head 41 and the blower pipe 21, and is closed by a cap 43. By this arrangement a pocket 44 is provided which receives the direct impact of the air from the blower exhaust forming a cushion which absorbs the vibratory impulses from the impeller blades 45 of the blower, so that the air passing from the port 42 through the blower pipe 21 is steady and free from the impulses from the blower, and without any tendency to eddy or spiral, which is found to be of advantage in preventing agglomeration of the impalpable powder in the device as will appear more clearly hereinafter.

The dusting material, which is usually an impalpable powder, is contained within a hopper 48 from which a feed duct 49 extends downwardly, terminating in a feed port 50 discharging into the upper portion of the blower pipe 21. Fixed in the upper portion of the pipe 21 and extending forwardly with relation to the direction of the air current, is a deflector plate 51. The plate 51 is curved forwardly and downwardly under the port 50, and is also transversely arched as illustrated in Fig. 6; and the lateral edges 52 are secured to the wall of the pipe throughout their extent. The deflector plate being arched as shown in Fig. 6, offers but slight resistance to the air, and at the same time will distribute the powder evenly throughout the width of the blower pipe. While the deflector plate offers but slight resistance to the flow of air, it produces sufficient suction at its forward edge 53 to assist in drawing the powder into the current. With the construction described the air and powder are well mixed, and by avoiding eddying and spiraling, the powder is not forced centrifugally against the walls, which often causes powders having the physical characteristics common to powders of the type used, to adhere to the walls and gradually agglomerate.

The feed duct 49 may have any desired cross-sectional configuration, either circular as illustrated in Fig. 5 or rectangular as in Fig. 7. The quantity of powder fed from the hopper is controlled by valve 55 actuated by a lever 56 which may be mounted upon the blower 39.

An agitator 57 is mounted within the hopper 48 upon a transversely extending shaft 58 which is actuated by an arm 59 connected by a link 60 to a rocker arm 61. The agitator 57 and the impellers 45 of the fan blower 40 are preferably driven by a power take-off from the tractor. To this end a gear housing 62 is provided for a train of gears 63, 64 and 65. Gear 63 is driven by a belt 66 in turn actuated by a belt deriving power from a power take-off 67 from the tractor, said take-off being only conventionally illustrated. The gear 63 meshes with gear 64 on the shaft 68 of the air impeller. The gear 63 also meshes with gear 65 upon the shaft of which is a crank arm 69 connected by a link 70 to the rocker arm 61 for actuating the agitator 57.

When the powder is dropped from the feed duct 49 onto the deflector plate, the convex upper face of said plate will distribute the powder evenly throughout the width of the blower pipe, due to the longitudinal and transverse curvature of the plate, as illustrated in Fig. 6; and the suction created at the end of the distributor plate will assist in preventing any of the powder being retained on the plate.

As the air passes in a straight stream from the blower head port 42 to the distributor head 23 without any tendency to spiral or eddy, all centrifugal action is avoided, which action would cause particles of the powder to be thrown against and adhere to the walls of the blower pipe; and this would continuously accelerate until an agglomerate mass or masses of powder be formed and interfere with the efficient operation of the device.

A V-shaped deflector 71 is provided within the distributor head 23 to distribute the mixed air and powder equally to the several nipples 24 and the nozzles connected thereto. The deflector 71 comprises a pair of tapered arms 72 diverging laterally from the apex 73 with the ends 74 thereof extending into the inner ends of the outermost nipples 24 and preferably secured to the inner walls thereof. The upper and lower edges 75 and 76 of the tapered arms 72 are spaced from the adjacent upper and lower walls 23' and 23", respectively, of the distributor head 23, and this distance is such as to evenly distribute the powder ladened air to the several nipples.

I claim:

1. In a dusting machine, a longitudinally disposed blower pipe, a tubular blower head of substantially uniform diameter communicating intermediate its ends with said blower pipe, a rotary blower having an exhaust discharging into one end of said head, a cap fixedly closing the opposite end of said head, a distributor head at the opposite end of said blower pipe from said blower head and means for supplying powder to said pipe at a point between said blower head and said distributor head.

2. In a dusting machine as set forth in claim 1 the improvement wherein said blower head and said blower pipe are connected at an acute angle.

3. In a dusting machine, a longitudinally disposed blower pipe, means at one end of said pipe for delivering a non-pulsating, non-rotary air current through said pipe, a distributor head at the opposite end of said pipe, said head having a plurality of radially disposed nipples, a discharge nozzle connected to each nipple, means for continuously feeding a powder to said blower pipe through substantially the horizontal diameter thereof, and a deflector member for equalizing the quantity of air and dust mixture supplied to said nipples.

4. A device as set forth in claim 3 in which said deflector comprises a V-shaped plate arranged in said distributor head and comprises a pair of tapered arms having their ends extending into the inner ends of the outermost nipples, and the upper and lower edges of said arms being spaced from the adjacent top and bottom walls of the distributor.

References Cited in the file of this patent

UNITED STATES PATENTS

| Number | Name | Date |
|---|---|---|
| 831,669 | Leggett | Sept. 25, 1906 |
| 987,807 | Lonskey | Mar. 28, 1911 |
| 1,069,306 | Walker | Aug. 5, 1913 |
| 1,205,513 | Carlson | Nov. 21, 1916 |
| 1,282,697 | Johnson | Oct. 22, 1918 |
| 1,396,319 | Champlin | Nov. 8, 1921 |
| 1,528,252 | House | Mar. 3, 1925 |
| 2,208,893 | Burch | July 23, 1940 |
| 2,455,292 | Borden | Nov. 30, 1948 |